March 5, 1940.                R. E. REASON                2,192,385
                         SIGHT TESTING INSTRUMENT
                           Filed July 7, 1937
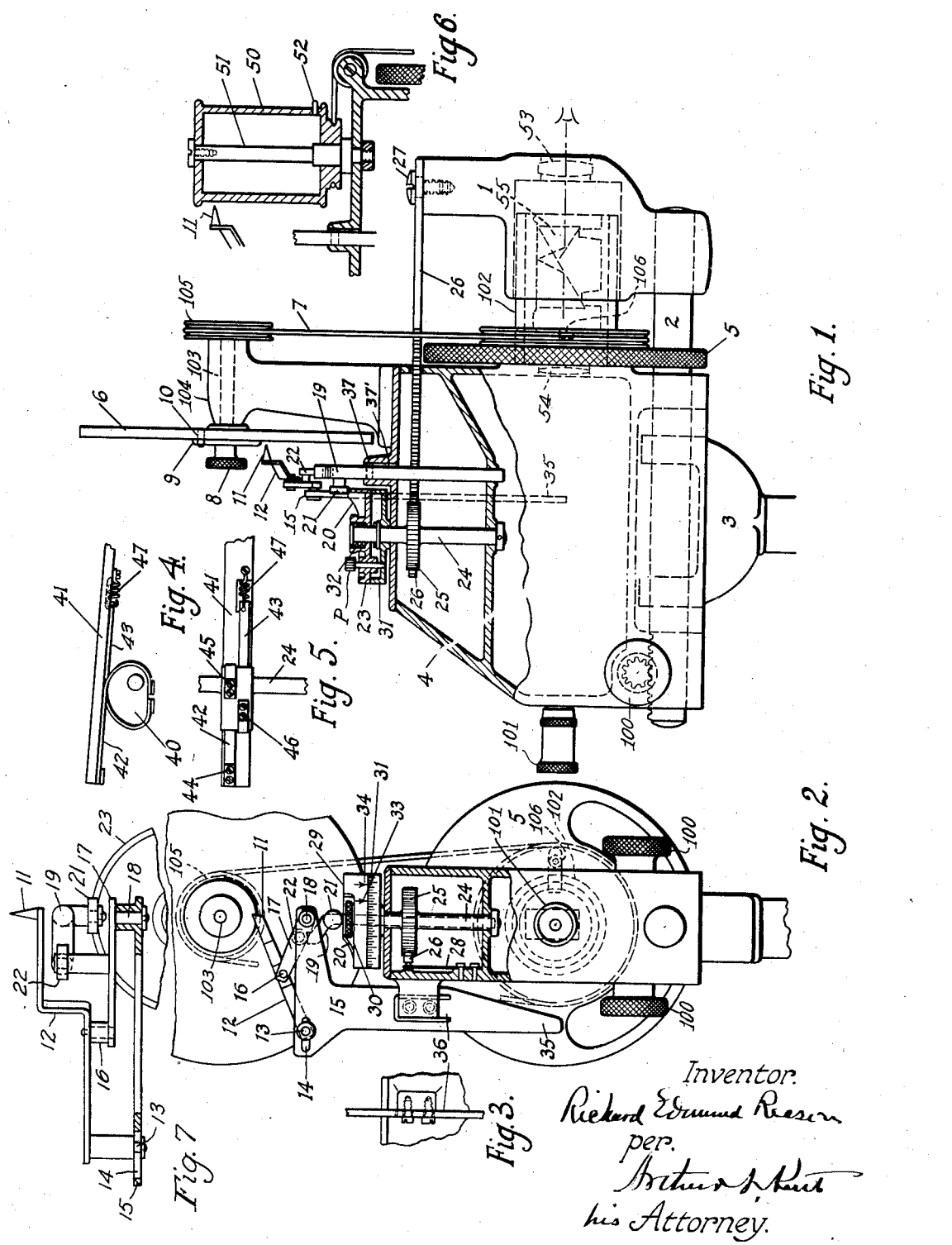
Inventor.
Richard Edmund Reason
per.
Arthur J. Kent
his Attorney.

Patented Mar. 5, 1940

2,192,385

UNITED STATES PATENT OFFICE 2,192,385

SIGHT TESTING INSTRUMENT

Richard Edmund Reason, Leicester, England, assignor to Kapella Limited, Leicester, England, a company of Great Britain Application July 7, 1937, Serial No. 152,412
In Great Britain July 10, 1936

3 Claims. (Cl. 234—1)

This invention relates to recording apparatus for sight testing apparatus of the type in which the power of the lens of the eye examined is determined by measuring the axial separation of certain movable optical elements with respect to other fixed optical elements necessary to focus an image of a target on the retina of a subject's eye, an example of which is set forth in my U. S. Patent No. 2,049,222, issued July 28, 1936.

According to the invention, a recording member is moved automatically relatively to a paper disc or strip whenever the axial distance between said movable and fixed optical elements is varied, and then, when the image of the target has been brought into focus, the recording member is manually pressed against the paper or vice versa to record the axial separation of the optical elements, or a function of that separation, such as one which will give a direct reading of the power of the lens of the subject's eye.

Most eyes have more or less astigmatism, so that the power in different meridians varies. It is necessary, therefore, to obtain a record of the power in the different meridians. This may be accomplished by automatically moving a record sheet and a recording mechanism relatively to each other whenever the angular position of the optometer is changed.

These objects I accomplish, according to the invention, by providing in or by attaching to such an instrument a recording mechanism comprising a marking device, a holder to carry a medium such as a piece of paper on which to record, the marking device and the holder being mounted for relative traversing movements whenever the axial distance between said movable and fixed optical elements is varied and/or the angular position of the optometer is changed, and manually controlled means whereby the medium may be marked by the marking device each time an observation is to be recorded. The marking device may have the form of a stylus movable relatively to a chart in a chart-holder on a convenient system of co-ordinates. The stylus may conveniently be moved in the direction of one of the co-ordinates and the holder in the direction of the other co-ordinate.

In order to record graphically on an open scale without employing an excessively large sheet of paper, I may adapt the mechanism to record over a fraction of the total range of the instrument, and provide means whereby this fraction may be positioned in any predetermined part of the total range. In order that one scale on a graph paper should be applicable to any part of the said total range it is generally necessary that the scale should be linear. It sometimes happens, however, that the adjustment of the instrument, particularly the power adjustment, follows a non-linear law, and in such a case I may employ a scale-converting mechanism between the adjustment means of the instrument and the traversing means of the recording mechanism.

As an example showing the application of the invention, a graphical recorder applied to an optometer of the kind described in U. S. Patent No. 2,049,222, in which the power is measured by the axial separation of optical elements mounted in two axially separable casings, will be described.

The example is illustrated by the accompanying drawing, in which Figs. 1 and 2 show, in side and end elevation, a polar graph recorder; Fig. 3 shows a detail thereof; Figs. 4 and 5 show, in plan and side elevation, a scale-converting mechanism therefor; Fig. 6 shows a construction for rectangular co-ordinates; and Fig. 7 shows in plan on an enlarged scale, the stylus operating mechanism.

The optometer selected for illustration comprises a casing 1 carried in front of the subject's eye on a shaft 2 slidably supported in a bracket 3 which may be attached to a base. The casing supports the optometer lens 53, which is the lens 14 of Patent No. 2,049,222, and the distance of the lens from the eye may be set before measurements are taken by sliding the shaft through the bracket, or by movement of the whole instrument relatively to the subject's head, which is presumed to be held in some form of headrest. The power is measured by axially displacing relatively to the casing 1 a casing 4 slidably mounted on the shaft 2 and moved by means of the pinion knobs 100. The casing 4 carries a lens 54, which is the lens 12 of Patent No. 2,049,222. Rotatably carried by the casing 4 is a tube 102, in which is mounted the prism 55, which is the prism 28 of Patent No. 2,049,222. The lamp and its condenser system may be mounted either on the casing 4 or on the casing 1. The eyelens 26 of the aforesaid patent is carried in the eyepiece 101. Rotation of the instrument relatively to the subject is effected by rotating an adjustment wheel 5 which turns the tube 102 carrying the prism 55 by means of a key 106 passing through a slot cut round the tube 102 which houses the prism mounted. A rotatable holder 6 to carry a sheet of polar graph paper is conveniently mounted on a shaft 103 rotating in a bearing bracket 104 and is coupled with the said wheel by means of a belt 7 which drives a pulley 105 fixed to the shaft. The holder may rotate through 360° while the wheel turns through 180°, and, although only one turn is shown, the belt may take two or more turns round the pulley of the holder and may be anchored to each pulley to prevent slip. The paper may be clamped to the holder by means of the screw and washer 8 and 9 and located rotationally by a pin 10 which engages a corresponding radial slot in the paper. The stylus 11 is carried for straight-line motion on a lever 12. The lever is pivoted at one end on a pin 13 sliding in a slot 14 in a plate 15 supported from the casing 4, and is pivoted at its mid point 16 to a lever 17 pivoted at 18 to the aforesaid plate 15. The length of the link 17 is half that of the stylus lever, and when the link 17 is rotated the stylus describes a straight line. The stylus is interlocked with the power adjustment of the instrument through a plunger 19 and a lateral flange on a disc 23. This flange has three sections 20, 29 and 30. The margins of sections 29 and 30 lie in parallel planes perpendicular to the axis of rotation of the disc 23, while the margin of section 20 is inclined to an angle to such planes and constitutes what will hereafter be termed the cam 20. A roller 21 pivoted to the plunger rests on the cam surface 20 of the flanged disc 23, and a roller 22 pivoted to the lever 17 rests on the flat upper laterally offset end of the plunger. The disc 23 makes somewhat less than one revolution to represent the total range of adjustment of the instrument; but the lever system is only operated through a part of the total range, i. e. while the roller 21 engages the cam 20. Throughout the remainder of the motion of the power adjustment the roller rests on the parts 29 or 30 of the flange on the disc 23, and the stylus is correspondingly held at the top or the bottom of its stroke. The disc 23 may be angularly adjusted with respect to the flanged disc 31 and its shaft 24 to cause the cam 20 to operate over any portion of the measuring range. A spring not shown may urge the lever downwards, and the plunger may be keyed against rotation by a pin 37 which extends from the plunger into a keyway 37'. The cam is formed on a camwheel 23 pressed by a spring 32 against the edge of a laterally extending flange on a disc 31 fixed to the shaft 24. The angular length of the cam represents but a fraction of the total range of the instrument, and the cam surface terminates in two surfaces 29 and 30 contained in planes normal to the axis of the shaft. The shaft is rotated according to the separation of the casings 1 and 4 through a total of somewhat less than one revolution by means of the gear wheel 25 and rack 26, the rack being pivoted to the casing 4 at 27 and pressed against the gear wheel by the spring 28. Thus the stylus is moved radially over the paper while the cam surface 20 of the disc 23 is moving under the roller 21, and is held without strain at the top or the bottom of the paper throughout the remainder of the range by the surfaces 29 and 30. The cam wheel which is driven by friction may be manually rotated relatively to the disc to position the recorded fraction in any part of the total range, and for the purpose of this example it is supposed that the power is proportional to the separation of the casings so that the divisions on the graph paper will apply to all parts. The portion of the range which the graph represents may be shown by two index marks 33 and 34 on the cam-wheel and a scale on the periphery of the flanged disc 31. The angular separation of the marks 33 and 34 is equal to the angular length of the cam track 20. The scale on the periphery of the disc 31 is in dioptres. Normally the graph paper covers a range of perhaps six dioptres, and the total range is perhaps thirty dioptres or more. To permit angular adjustment of the discs 23 and 31, the disc 31 is provided with a series of holes 38 spaced apart one or two dioptres. An indexing plunger P is slidably mounted on the disc 23 for engagement with one or other of such holes. During adjustment the stylus travels just clear of the surface of the paper, and to make a record the observer presses the stylus against the paper by pulling on the lower end 35 of the plate 15 which is pivoted to the casing, for example by a ligament hinge, at 36.

This hinge is formed by cutting a U-shaped slot in the plate 15 and clamping the tongue so formed to a bracket extending laterally from the casing 4, as shown in Figs. 2 and 3.

In use, the observer first determines the upper and lower limits of the subject's power, sets the cam to cover that part of the range by means of the scale, and then records the power at every few degrees round the pupil.

The mechanism may be adapted to record on cartesian co-ordinates by providing, in place of the disc 6, a cylinder 50 mounted for rotation about a vertical spindle 51 and coupled with the wheel 5 by the belt 7, as shown in Fig. 6. The stylus 11 just clears the surface of the cylinder during adjustment as in the case of the disc, and, to allow space for clips or for a glued joint for holding a sheet of graph paper round the cylinder, the cylinder preferably makes rather less than one revolution to represent the full rotation of the instrument. A pin 52 may be provided to engage a perforation in the paper or to locate the end of the paper in order to correlate the divisions thereon with the rotation of the instrument.

If the power adjustment of the instrument follows a non-linear law a scale-converting mechanism may be incorporated in the linkage between the stylus and the adjustment. One such mechanism is shown in Figs. 4 and 5. The gear wheel 25 of Fig. 1 is replaced by a cam 40 and the rack 26 by an arm 41. The arm drives the cam by means of tapes 42 and 43, of which the tape 42 is anchored both to the arm and to the cam at 44 and 45 respectively, and the tape 43 is anchored to the cam only at 46 and is attached to the arm through a tension spring 47. The cam is so shaped that its angular rotation is proportional to the power.

What is claimed is:

1. Objectively-operated sight testing apparatus having adjustable means, one for determining the power of the subject's eye by axial adjustment of the optical portion of the apparatus and another for rotating the optical portion of the apparatus relatively to the eye, and also including recording means comprising a stylus and a holder to carry a chart on which to record, the stylus being mounted for traversing movements relatively to the holder, the stylus and the holder being operatively connected one with the power adjustable means and the other with the rotational adjusting means, means comprising a member continuously operatively connected to said power adjustable means, and a cam member driven by said member and manually adjustable relatively thereto and having a cam track adapted to transmit traversing motion to said stylus through a fraction only of the total range of axial adjustment of the optical portion of the apparatus.

2. Objectively-operated sight testing apparatus, having adjustable means, one for determining the power of the subject's eye by axial adjustment of the optical portion of the apparatus and one for rotating the optical portion of the apparatus relatively to the eye, and also including recording means comprising a stylus and a holder for a chart on which to record, the stylus being mounted for traversing movements relatively to the holder, the stylus and the holder being operatively connected one with the power adjustable means and the other with the rotational adjusting means, means for traversing the stylus by the power adjustable means over a fraction only of the range of movement of said power adjustable means, means for adjusting the relative position of connection between the stylus traversing means and the power adjustable means whereby to preselect the position of said fraction within the total range, and means for converting a non-linear movement of the power adjustable means with respect to variations in power into linear motion with respect to such variations comprising a rotatable cam whose periphery is in engagement with said power adjustable means and whose shape is such that its rotational movement is proportional to the power.

3. Objectively-operated sight testing apparatus, having adjustable means, one for determining the power of a subject's eye by axial adjustment of the optical portion of the apparatus and one for rotating the optical portion of the apparatus relatively to the eye, and which also includes recording means comprising a stylus and a holder for a chart on which to record, means for traversing the stylus with respect to said holder, said last mentioned means being operatively connected to the power adjustable means, and means for converting a non-linear movement of the power adjustable means with respect to variations in power into linear motion with respect to such variations for operating the traversing means, comprising a cam whose periphery is coupled with said adjustable means and whose shape is such that its movement is proportional to the power.

RICHARD EDMUND REASON.